Dec. 25, 1956   W. H. DU SHANE   2,775,175
HITCH DEVICE
Filed Dec. 3, 1951   4 Sheets-Sheet 1

INVENTOR.
WALLACE H. DU SHANE
BY
ATTORNEYS

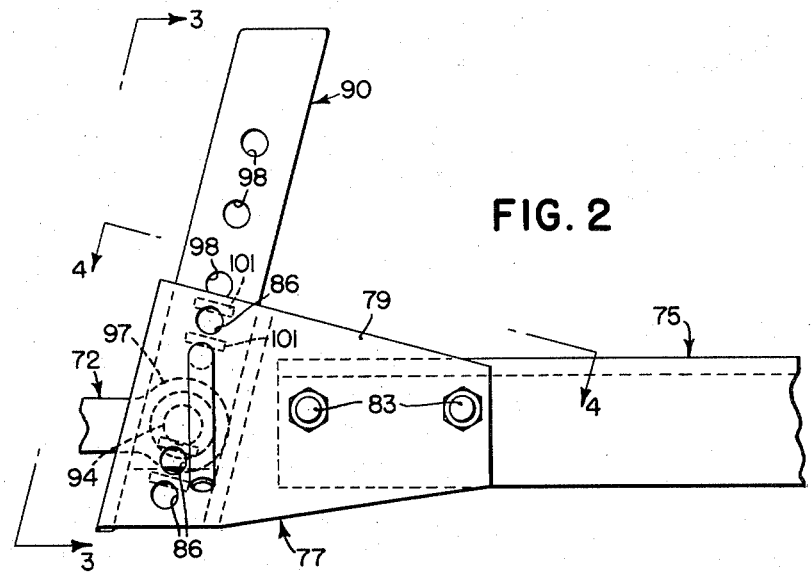
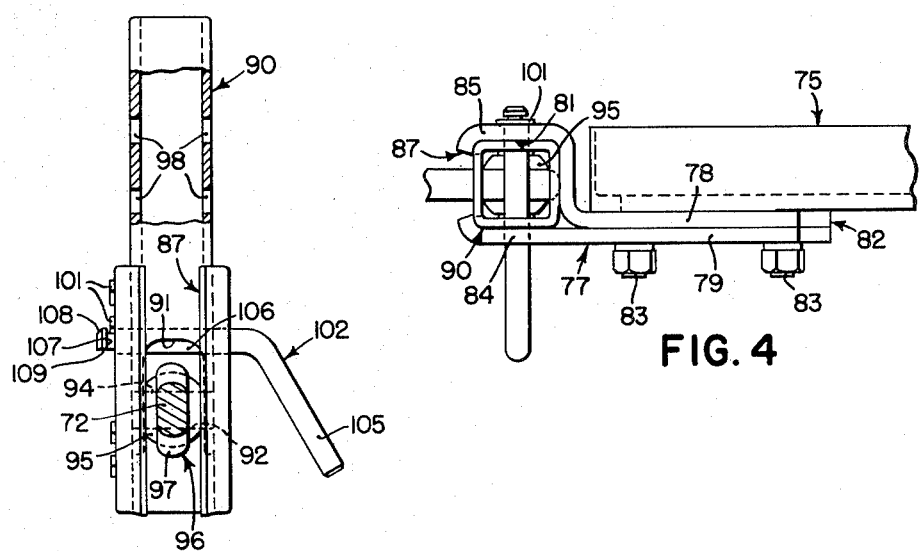

*INVENTOR.*
WALLACE H. DU SHANE

Dec. 25, 1956  W. H. DU SHANE  2,775,175
HITCH DEVICE
Filed Dec. 3, 1951  4 Sheets-Sheet 4
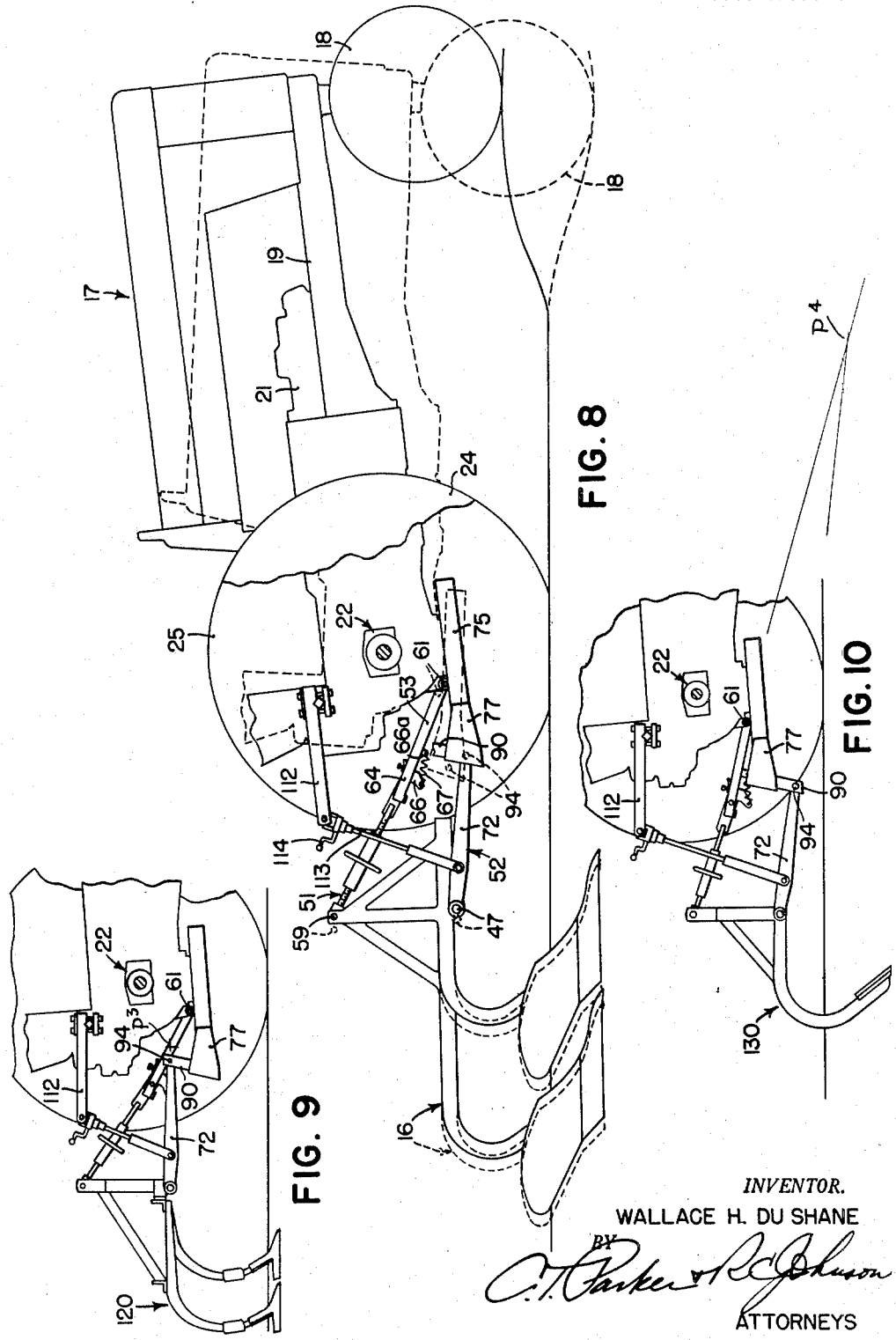
INVENTOR.
WALLACE H. DU SHANE
BY
ATTORNEYS

United States Patent Office

2,775,175
Patented Dec. 25, 1956

2,775,175

HITCH DEVICE

Wallace H. Du Shane, Waterloo, Iowa, assignor to Deere Manufacturing Co., Dubuque, Iowa, a corporation of Iowa Application December 3, 1951, Serial No. 259,537

8 Claims. (Cl. 97—46.09)

The present invention relates generally to agricultural machines and more particularly is concerned with hitch devices for connecting implements to a propelling tractor.

The object and general nature of the present invention is the provision of a hitch device for connecting a ground-working implement to a propelling tractor, the hitch device being so constructed and arranged that substantially constant depth of operation is secured irrespective of irregularities in the ground surface over which the outfit moves. Further, it is a feature of this invention to provide a hitch device which is adapted to receive any one of a number of varieties of ground-working tools, the hitch device being so constructed and arranged whereby through suitable adjustments the hitch device may be arranged to receive any one of a wide variety of tools and connect the same with the tractor so as to produce a steadily running outfit and in which the tendency for the tool to operate too deep or too shallow is substantially entirely eliminated.

More specifically, it is a feature of this invention to provide a hitch device for connecting an implement with a propelling tractor, in which said hitch device includes upper and lower link means so connected with the tractor that any vertical or up-and-down movement of the front end of the tractor, as when passing over uneven ground, causes no appreciable change in the position of the implement, particularly with respect to tilting the implement in a vertical fore-and-aft extending plane. Ordinarily, tilting a ground-working implement in a vertical fore-and-aft extending plane causes the same to tend to run either deeper or more shallow, but according to the principles of the present invention, the implement runs steadily even though the front end of the tractor may move upwardly or downwardly to an appreciable extent. More specifically, it is an important feature of this invention to connect the upper and lower link means of the hitch device with the tractor at points that are spaced generally horizontally in a fore-and-aft direction, whereby up-and-down movement of the front end of the tractor does not act through said link means to tilt the implement. Another important feature of the present invention is the provision of a hitch device having upper and lower link means, the longitudinal lines of which converge generally forwardly to provide a virtual hitch point at which the implement is connected with the tractor, the lower link means being connected with the tractor for vertical adjustment relative thereto over a fairly wide range, whereby the link means of the hitch device may be adjusted either upwardly or downwardly so as to provide the substantially exact virtual hitch point which will afford the line of draft that will cause the implement, whether it be a light draft shallow operating implement, such as a rear cultivator, or a heavy draft deep tillage implement, such as a moldboard plow or subsoiler, to operate at the desired depth in a level position and to substantially continuously remain at the desired depth of operation without requiring any added weights on the implement or without requiring that any portion of the weight of the tractor be applied to the implement, either in an additive sense or in a subtractive sense. Where necessary, however, the link means, constructed according to the present invention, may be adjusted to provide for adding some of the weight of the tractor to the implement, as by having a negative angle of draft; that is, a line of draft that extends forwardly and downwardly from the center of resistance of the implement to a virtual hitch point which, in this case, is in a relatively low position, generally below the level of the center of resistance of the implement. On the other hand, other implements, such as the rear mounted cultivator mentioned above, require, for level operation, a relatively high angle of draft, with the virtual hitch point lying in a relatively high position with respect to the tractor, so that the line of draft extending between the virtual hitch point and the center of resistance of the tool will have a relatively large upwardly directed component of force, which will hold the tool at the desired depth of operation.

Still further, another feature of the present invention is the provision of overload release means, so constructed and arranged as to abruptly change the position of the virtual hitch point from, for example, a relatively low forward position to a rearward relatively high position with respect to the tractor, so that upon the occurrence of an overload, the virtual hitch point is shifted so that it tends to pull the implement out of the ground. In this connection, it is also a feature of this invention to provide an overload release device in the upper link means, preferably such device being so connected with the tractor power lift mechanism that relative movement between the parts of the upper link means serves to actuate the tractor power lift and cause the latter to raise the tools out of the ground.

A further object of this invention is the provision of a hitch device especially adapted to connect a ground-working implement with the tractor whereby the depth of operation of the implement is controlled substantially entirely by the position of the rear end of the tractor, whereby relatively abrupt and/or short-lived vertical displacements of the front end of the tractor, as when passing across small ditches, narrow waterways, small ridges and the like, do not appreciably change the level operating positions of the implement, yet when the rear wheels of the tractor reach such ridges, ditches or the like, the implement passes across them with substantially little change in position or depth of operation.

These and other objects and advantages of the present invention will be apparent to those skilled in the art after a consideration of the following detailed description of the preferred structure in which the principles of the present invention have been illustrated, taken in conjunction with the accompanying drawings showing the presently preferred embodiment.

In the drawings:

Figure 2 is an enlarged fragmentary detail view of the vertically adjustable connection between one of the lower links and the tractor.

Figure 3 is a view taken generally along the line 3—3 of Figure 2, and Figure 4 is a sectional view taken generally along the line 4—4 of Figure 2.

Figure 8 is a fragmentary view showing the manner in which the link means of the present invention serve to hold the implement in substantially level operation at a constant depth, irrespective of variations in the height of the front end of the tractor, as may occur when traveling over uneven ground.

Figures 9 and 10 illustrate how the hitch device of the present invention may readily be adjusted to accommodate a wide variety of implements, Figure 9 illustrating the use of the hitch device of the present invention as means for connecting a relatively light draft implement, such as a rear cultivator, to the tractor, and Figure 10 showing how a relatively heavy draft deep-tillage implement, such as a subsoiler, may be connected by the draft device of the present invention to a tractor for steady running at substantially constant depth of operation.

Figure 1:
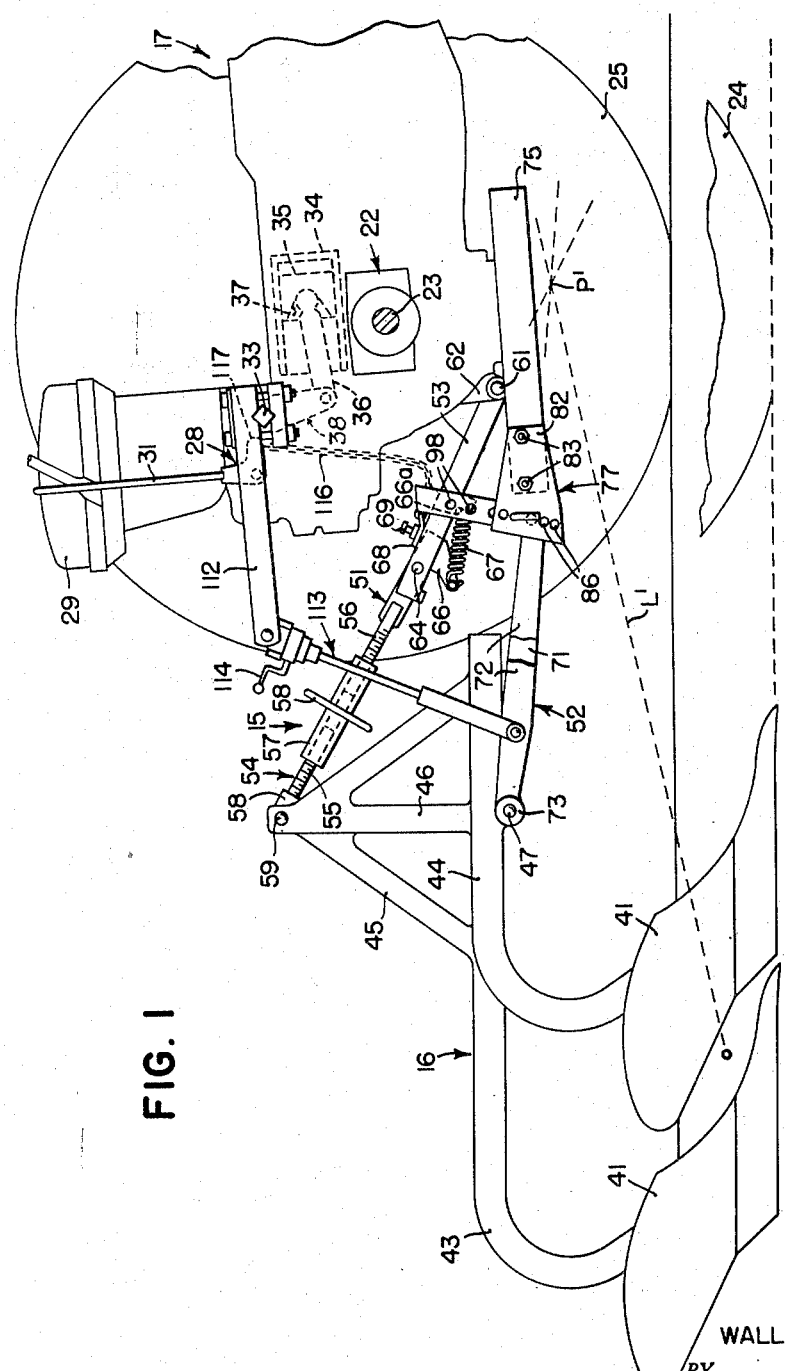
Figure 1 is a side view of a hitch device, constructed according to the principles of the present invention, arranged to connect a two-bottom moldboard plow to a farm tractor of the type having a power lift unit, for raising and lowering implements associated therewith.
Figure 5:
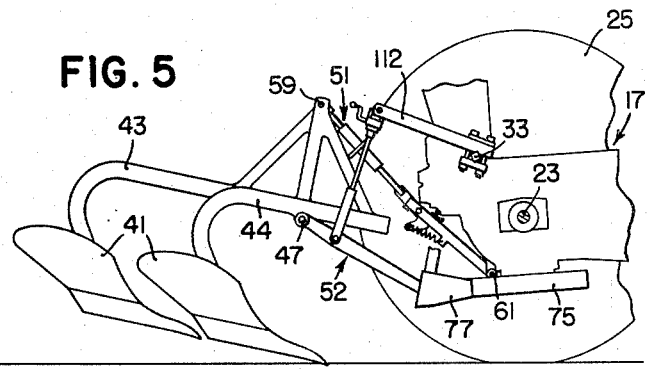
Figure 5 is a fragmentary diagrammatic view showing the position of the plow of Figure 1 when it starts to enter the ground, with the lower links set in the positions illustrated in Figure 1.
Figure 6:
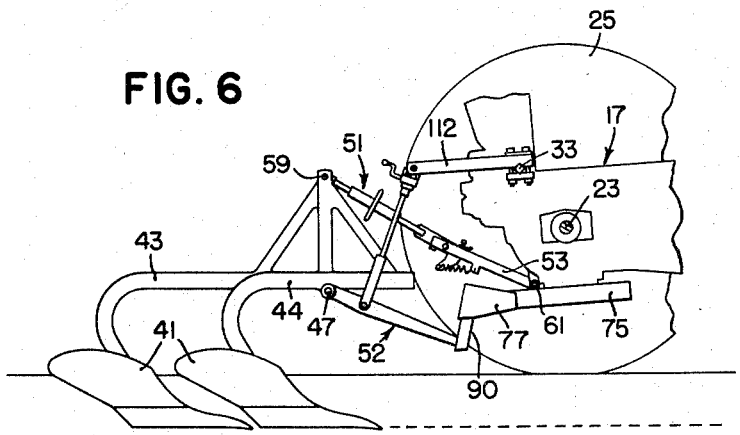
Figure 6 is a fragmentary diagrammatic view showing the lower links adjusted to provide a lower virtual hitch point, which may be necessary or desirable when operating in hard soil.

Referring first to Figure 1, the hitch device of the present invention, indicated in its entirety by the reference numeral 15, is shown for purposes of illustration as connecting a two-bottom moldboard plow 16 with a tractor 17. The tractor is generally conventional so far as the present invention is concerned, and as shown in Figure 8 the tractor includes front wheel means 18, a frame 19, a motor 21, and a rear axle structure 22 which includes axle shafts 23 to which right- and left-hand rear traction wheels 24 and 25 are fixed. The tractor 17 also includes a power lift unit 28 controlled from the operator's seat 29 on the tractor by a valve lever 31. The power lift unit 28 also includes a transverse rockshaft 33 and hydraulic mechanism which comprises a cylinder 34 in which a piston 35 is movable in one direction by power, which movement is transmitted through a piston rod 36 to an arm 38 on the rockshaft 33. The piston rod 36 is freely movable away from the piston 35, but when the power lift unit is operated to force the piston 35 rearwardly (to the left as viewed in Figure 1), the front end of the piston rod 36 seats in a socket 37 whereby further movement of the piston 35 in a rearward direction serves to rock the shaft 33 by power in a clockwise direction as viewed in Figure 1. This movement of the rockshaft 33 is made use of for raising the implement 16 into a transport position, supported entirely by the tractor 17, as will be explained in detail below.

The two-bottom moldboard plow 16 is likewise of conventional construction, so far as the present invention is concerned. The implement 16 includes a pair of plow bottoms 41 fixed to plow beams 43 and 44 suitably interconnected by frame braces or the like, the frame of the plow also including a pair of upwardly extending converging brackets 45 and 46, the upper portions of which are apertured to receive connecting means 51 (referred to later in detail) for connecting the plow with the tractor 17. The brackets 45 and 46 also include lower outwardly extending studs 47 to which reference will be made below.

The hitch device 15, with which the present invention is more particularly concerned, comprises an upper link means 51, which forms at least a portion of the connecting means mentioned above, and lower link means 52. The upper link means 51 includes a forward link member 53 and a rear link member 54, the latter including two relatively movable parts 55 and 56 interconnected by a turnbuckle sleeve 57 carrying a hand wheel 58. The associated threaded portions are of opposite hands, and therefore turning the hand wheel 58 in one direction or the other serves to increase or decrease the effective length of the upper link part 54. The rear end of the part 54 includes a ball joint member 58 which is connected by a quick attachable pin 59 with the upper ends of the plow frame brackets 45 and 46. The forward end of the forward link member 53 is connected by universal joint or ball joint means 61 to a bracket 62 that is attached to the rear end of the tractor in any suitable way and in a relatively low position relative to the rear axle structure 22. The two link parts 53 and 54 are pivotally interconnected by any suitable means, such as a pin 64. Secured to the link parts 53 and 56 are lugs 66 and 66a, and a tension spring 67 is connected at its opposite ends to said lugs, the spring being arranged to yieldably resist downward buckling of the two links 53 and 54. The links are held in a position just off center by an abutment bracket 68 carried by the link 53 and including a member, such as a set screw 69, engageable with the adjacent link part 56 for holding the upper link means 51 in substantially straight-line relation against all normal forces.

The lower link means 52 comprises a pair of link members 71 and 72, each of which has a ball connector 73 at its rear end apertured to be releasably attachable to the associated stud 47 carried by the plow.

The tractor 17 includes, as a normally permanent part thereof, a drawbar support frame 75 secured by any suitable means to the lower central portion of the rear axle structure 22 of the tractor. According to the principles of the present invention, a bracket 77 is fixed to each side of the drawbar support frame 75, preferably adjacent the rear portion thereof. Each bracket 77 includes a pair of bracket plates 78 and 79 shaped to provide a generally vertically extending socket section 81 and a forward apertured flange portion 82. The flanged portions 82 are fixed to the rear portions of the drawbar frame 75 by bolts 83. The rear portion of each of the brackets 77 has side walls 84 and 85 of the socket section 81 provided with a plurality of openings 86. The rear wall of the socket section 81 is open, being in the form of an elongated slot 87 extending from top to bottom of the socket portion 81 of the bracket 77.

A connector member 90 is pivotally connected to the forward end of each of the lower links 71 and 72. Each connector member 90 is in the form of a tubular part conforming in cross section to the cross section of the socket section 81, as best shown in Figure 4, whereby in any position of vertical adjustment of the part 90 in the part 81, the latter holds the part 90 against displacement in a fore-and-aft direction under the draft loads imposed thereon. The front and rear walls of the connector member 90 are cut away, as at 91 and 92, and the adjacent side wall portions are apertured to fixedly receive a pivot pin 94 on which the ball section 95 of a ball joint connection 96 is disposed for rocking movement. The forward end of each of the lower links 71 and 72 is enlarged and shaped, as at 97, to rockably receive the ball section 95. The side walls of the connector member 90 are provided with pairs of apertures 98, there being three of such pairs in the illustrative structure shown in the drawings. On the inner side wall 85 of each of the brackets 77 a plurality of straps 101 are fixed, as by welding, one adjacent each of the apertures 86 therein. As best shown in Figure 3, these strap members 101 serve to hold a connecting pin 102 in place in the bracket 77, the pin, in turn, holding the associated connector 90 in place in the bracket. The connector-engaging pin 102 comprises a member having a handle section 105 and a shank section 106, the end of which is provided with an annular groove 107 and a beveled end 108, there being a portion of the pin slabbed off, as at 109. Each strap member 101 overlaps the associated opening 86 in the side wall 85 an amount which corresponds to the reduction of stock of the pin 102 formed by the slabbed off portion 109. When the pin 102 is inserted through registering openings in the bracket 77 and the connector member 90, with the handle 105 extending upwardly, the beveled end 108 passes under and beyond the associated strap 101 so that when the handle 105 is turned downwardly the grooved portion 107 receives the strap 101 which then retains the pin in place, gravity holding the handle 105 downwardly so that the pin remains interlocked with the associated parts until, when desired, the handle 105 is turned upwardly and the pin withdrawn. Each of the connector members 90 is disposable in the socket section 81 of the associated tractor-carried bracket 77 either from the top or from the bottom of the socket. There are three sets of openings 98 in each connector member and four sets of openings in the side walls of each bracket. Further, the open slots 87 in the rear walls of the socket sections 81 are provided for the purpose of receiving the forward portions of the links 71 and 72 when the lower ends of the connector members lie within the socket sections 81. Thus, the forward ends of the lower links 71 and 72 may, when desired or necessary, be disposed in a relatively low position, with the connector members 90 extending upwardly into the sockets from the lower sides thereof, or, if desired, the connector members 90 may be inserted into the associated socket sections 81 from above, which dispose the forward ends of the links 71 and 72 in relatively high positions with respect to the tractor. In this way, the hitch device of the present invention may readily be adapted for any one of a wide selection of implements and other attachments, particularly ground-working implements in which the required line of draft to provide level and stable operation may be provided. Secured to each end of the power lift rockshaft 33 is a lift arm 112, the rear end of which is connected by a lift link 113 to the associated lower link 71 or 72. One, or both, if desired, of the lift links 113 is provided with a crank screw apparatus 114 which provides for changing the effective length of the associated lifting link 113, and operating the adjusting apparatus 114 serves to level the implement laterally, since the arms 112 are connected rigidly to the same part, namely, the transverse power lift rockshaft 33. A flexible element 116 is connected with one of the two upper link sections 53 and 54, extending between said one section and an arm 117 that is fixed to the power lift control lever 31.

The operation of the hitch device as described above is substantially as follows.

Assuming that the hitch device has been arranged to connect a two-bottom moldboard plow, such as the one shown at 16 in Figure 1, to the tractor 17, and assuming, further, that average soil conditions are encountered, the connector members 90 are interlocked with the associated brackets 77 in the position shown in Figure 1, with the connector members 90 extending upwardly from the lower links 71 and 72, as shown. When the plow is in normal operation, with the right-hand tractor wheel 24 operating in the previously formed furrow and the other or left-hand tractor wheel operating on the land, the line of draft will extend from the center of resistance of the two plow bottoms 41 forwardly and upwardly to the virtual hitch point $P^1$, which lies at the intersection of the forwardly extended longitudinal lines of the upper and lower link means 51 and 71, 72. The line of draft just mentioned is indicated by the reference character $L^1$. Normally, the weight of the plow and associated parts is not carried on the tractor; instead, the plow 16 is capable of relatively free up-and-down movement with respect to the tractor, within limits, about the virtual hitch point $P^1$. The position of the lower links 71 and 72, especially the connectors 90, is so chosen that the virtual hitch point $P^1$ lies at such an elevation that the plow runs steadily and level at the desired depth of operation, the the vertical components of the forces imposed on the plow being substantially in balance. That is to say, the upward component of the draft pull, extending from the center of resistance of the plow forwardly and upwardly to the virtual hitch point $P^1$, plus the forces acting upward which tend to support or stabilize the plow, as the upward forces on the furrow wheel or landside, is substantially equal to the vertical component of the soil pressure acting against the plow bottoms plus the weight of the implement. If, for example, the operator finds after plowing a round or two, or less, that the plow tends to run too deep and cannot be shallowed by increasing the effective length of the upper link 51 due to the excessive downward pressure on the furrow wheel or landside beyond that which the soil could support, the quick detachable pins 102 are taken out, the connector members 90 raised and the pins 102 inserted in the next set of registering holes 86 and 98, thereby raising the virtual hitch point. If, on the other hand, the plow tends to run too shallow and cannot be made to plow deeper by decreasing the effective length of the upper link 51 as noted by the furrow wheel or landside leaving the furrow bottom, the virtual hitch point may be lowered by removing the pins 102, lowering the connector members 90, and then reinserting the pins 102. Normally with the proper virtual hitch point setting of the connector members 90 for a particular plow and soil condition, a full range of plowing depths may be effected by turning the hand wheel 58 in one direction or the other thereby increasing or decreasing the effective length of the upper link 51. This has the effect of changing the suction of the plow bottoms, thereby tending to cause them to run deeper or more shallow, the hand wheel 58 also serving as means for leveling the plow in a fore-and-aft direction.

Figure 7:
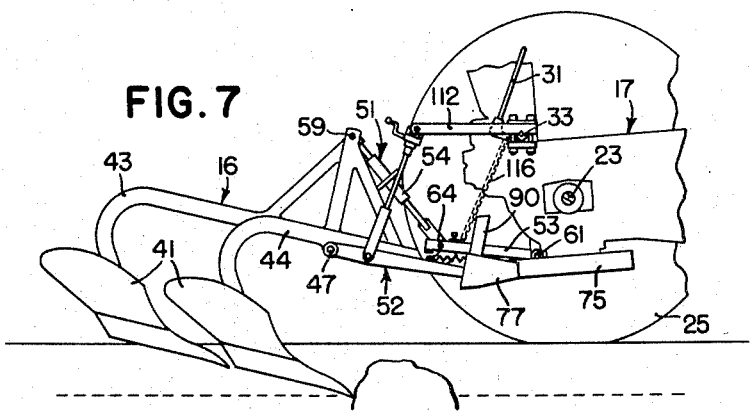
Figure 7 is a view similar to Figures 1 and 6, showing the position of the parts when the overload release incorporated in the upper link means operates to relieve the plow, both by raising the virtual hitch point of the plow connection and also by operating the power lift of the tractor to lift the plow into a transport position.

If the plow should encounter abnormal soil resistance, the compression forces to which the upper link 51 is subjected increase by a relatively large amount, with the result that the resistance of the relief spring 67 is overcome and the two link parts 53 and 54 buckle downwardly until the forward link 53 strikes the rear portion of the drawbar support frame 75, the latter thereby serving as a stop for limiting the downward movement of the forward link part 53 when an overload is encountered. This movement has two effects. First, the pivot 64 becomes, in effect, the point of connection between the upper link member and the tractor, and this new positioning of the parts provides a virtual hitch point which is spaced well to the rear of the tractor axle and momentarily establishes a line of draft that makes a relatively large angle with respect to the surface of the ground, so that the vertical component of the line of draft is sharply increased, thereby tending to pull the implement out of the ground. Secondly, when the forward link part 53 swings downwardly a pull is exerted through the chain 116 against the arm 117 on the power lift control valve lever 31, substantially immediately throwing the same into its raised position, whereby fluid is directed under pressure into the cylinder 44 which moves rearwardly and rocks the power lift rockshaft 33 in a direction to swing the arms 112 upwardly and thus raise the plow into its transport position. Figure 7 illustrates the positions of the hitch parts after the upper link means 51 has tilted in response to an overload but before the power lift of the tractor has been operated to raise the implement into its transport position. After the tractor has stopped and the overload conditions dissipated, the act of raising the implement, such as the plow 16, into its transport position automatically effects the movement of the upper link parts 53 and 54 into their normal operating position. During normal plowing, as shown in Figure 1, the plow 16 is capable of a limited amount of up-and-down movement relative to the tractor since normally the piston rod 36 lies a slight distance away from the piston 35, whereby the plow may move downwardly a limited amount relative to the tractor, and since the piston rod 36 may move away from the piston 35 without resistance, the plow 16 is capable of moving upwardly relative to the tractor, such movements occurring about the virtual hitch point $P^1$, it being understood that the virtual hitch point $P^1$ varies slightly as the link means 51 and 52 swing vertically.

An important features of this invention lies in the connection of the relatively long upper link means 51 with the tractor, as at 61, a point which lies well forward of the brackets 77, whereby for most implements, the points 94 at which the forward ends of the lower links 71 and 72 are connected with the tractor lie well rearwardly and substantially at about the same level of the forward pivot connection 61. Therefore, as illustrated in Figure 8, up-and-down movement of the front end of the tractor as when the front wheels thereof pass over ridges, across depressions and the like do not affect the position of the implement to any appreciable extent, particularly, the implement is not tilted in a fore-and-aft direction so that, in the case of the plow 16, the suction is not varied and the plow continues to operate at substantially the same depth of operation even though the front wheels of the tractor may be displaced upwardly or downwardly. It is also to be noted that the virtual hitch point $P^1$ is well under the rear axle structure 22, this having the result that actually the plow 16 is gauged substantially entirely by the rear wheels of the tractor, particularly the wheel 24 operating in the previously opened furrow. If, on the other hand, the points 94 and 61 were spaced apart vertically a relatively great distance on the tractor, then up-and-down movement of the tractor would change the fore-and-aft relationship between these points and would therefore tilt the connected implement in a fore-and-aft direction, thus, as in the case of a plow, materially changing the suction thereof and causing the same to operate either more shallow or deeper than the intended depth of operation.

The hitch device of the present invention is admirably adapted for use with any one of a number of a wide selection of implements, some requiring a relatively low line of draft for proper operation and others requiring a relatively high line of draft. For example, in Figure 9 there is shown the hitch device of the present invention arranged to connect a relatively light draft shallow-operating implement, such as a rear mounted cultivator. The latter implement is indicated by the reference numeral 120 and is of conventional construction so far as the principles of the present invention are concerned. The cultivator 120 requires a relatively high hitch point and, accordingly, the connector members 90 are inserted into the brackets 77 from above, which places the upper ends of the links 71 and 72 in a relatively high position, the virtual hitch point $P^3$ for this arrangement lying well above the level of the hitch point $P^1$ mentioned above and also to the rear of the tractor rear axle structure 22. With the hitch device arranged as shown in this figure, there is no tendency for the cultivator to run too deep, and, as is the case with all implements, the position of the connector members 90 in the brackets 77 may be varied so as to provide the exact line of draft necessary to hold the implement level and at the desired depth in various soil conditions.

Figure 10 shows an implement of the heavy draft, deep tillage type, the implement being a subsoiler that is indicated in its entirety by the reference numeral 130. For implements of this type, the connector members 90 are inserted into the brackets 77 from below, which brings the point of connection 94 with the tractor relatively close to the ground, resulting in a relatively low virtual hitch point $P^4$. In all cases, of course, the actual point of connection 61 between the upper link means and the tractor is well ahead of the points of connections of the lower links 71 and 72 with the tractor, whereby vertical movement of the point 61, as when the tractor tips upwardly or downwardly at its front end, has only a minimum fore-and-aft component of movement. Thus, vertical movement of the front end of the tractor does not materially tilt the implement in a fore-and-aft direction and the implement maintains a substantially constant depth of operation.

While I have shown and described above the preferred structure in which the principles of the present invention have been incorporated, it is to be understood that my invention is not to be limited to the particular deails, shown and described above, but that, in fact, widely different means may be employed in the practice of the broader aspects of my invention.

What I claim, therefore, and desire to secure by Letters Patent is:

1. A hitch device for connecting an implement to a tractor having a rear axle structure, said hitch device comprising generally fore-and-aft extending upper and lower link means spaced apart generally vertically and adapted to be pivotally connected at their rear ends to generally vertically spaced apart points on said implement, means for connecting the forward end of the upper link means with the tractor, and means for pivotally connecting the forward end of the lower link means with the rear axle structure of the tractor, said last mentioned connecting means comprising a part pivotally connected at one end with the forward end of the lower link means and shiftable relative thereto so as to be reversible and thereby extend either generally vertically upwardly or downwardly therefrom, optionally, vertically extending means receiving said part in either position and adapted to be carried by the tractor, and means fixing said part to said part-receiving means in different vertical positions and in either upwardly or downwardly extending position relative thereto.

2. A hitch device for connecting an implement to a tractor, said device comprising generally fore-and-aft extending, upper and lower link means adapted to be pivotally connected at their rear ends to generally vertically spaced apart points on said implement, means attachable to the tractor for pivotally receiving the forward end of said upper link means, means attachable to the tractor for pivotally receiving the forward end of said lower link means, means for adjustably fixing one of said attaching means to the tractor in different vertical positions thereon, said upper link means comprising a pair of generally fore-and-aft extending toggle links adapted to buckle downwardly under the imposition of excessive compression forces thereon, and said tractor having means for stopping the downward movement of the forward toggle link at such a point that the line of said rear toggle link intersects the line of said lower link means at a virtual hitch point appreciably rearwardly of the intersection of the lines of said upper and lower link means when said toggle link means is extended, whereby the angle of the line of draft is materially increased, thereby tending to pull the implement out of the ground.

3. A hitch device for connecting an implement to a tractor, said device comprising generally fore-and-aft extending, upper and lower link means adapted to be pivotally connected at their rear ends to generally vertically spaced apart points on said implement and the front end of said upper link means being adapted to be pivotally connected with the tractor, means attachable to the tractor and providing a generally vertically extending socket section, a connecting member disposable for only generally vertically sliding movement in said socket means and pivotally connected with the front end of the lower link means, and means for adjustably fixing said connector member to said socket section in different vertical positions therein.

4. A hitch as defined in claim 3, further characterized by said connecting member being vertically reversible relative to said socket means, thereby providing two ranges of adjustment for said part, and means pivotally connecting the front end of the lower link means with one end portion of said connecting member.

5. A hitch device for connecting an implement to a tractor, said device comprising generally fore-and-aft extending upper and lower link means adapted to be pivotally connected at their rear ends to generally vertically spaced apart points on said implement, said upper link means including a pair of interconnected, generally fore-and-aft extending parts, said parts being adapted to buckle downwardly under the effect of compressive forces, as under overload conditions, to which said upper link means is subjected, and resilient means resisting relative pivotal movement of said parts, and stop means engageable with the forward part for limiting the downward movement thereof when an overload is encountered, whereby the virtual hitch point moves generally rearwardly so that the tendency to pull the implement upwardly is materially increased.

6. A hitch device for connecting an implement to a tractor of the type having a power lift and means for controlling the latter, said device comprising generally fore-and-aft extending upper and lower link means adapted to be pivotally connected at their rear ends to generally vertically spaced apart points on said implement, said upper link means including a pair of interconnected, generally fore-and-aft extending parts, said parts being adapted to buckle downwardly under the effect of compressive forces, as under overload conditions, to which said upper link means is subjected, and resilient means resisting relative pivotal movement of said parts, a generally vertically movable connection connected at its lower end with one of said downwardly movable parts and adapted to be connected at its upper end with said tractor power lift controlling means, and stop means engageable with one of said parts for limiting the downward movement thereof after said power left controlling means has been actuated.

7. A hitch device as set forth in claim 6, further characterized by said connecting means comprising a normally slack flexible element, whereby a limited amount of vertical movement of the implement relative to the tractor is accommodated.

8. A hitch device for connecting an implement to a tractor of the type having a power lift and means for controlling the latter, said device comprising generally fore-and-aft extending upper and lower link means adapted to be pivotally connected at their rear ends to generally vertically spaced apart points on said implement, said upper link means including a pair of interconnected, generally fore-and-aft extending parts, said parts being adapted to buckle downwardly under the effect of compressive forces, as under overload conditions, to which said upper link means is subjected, and resilient means resisting relative pivotal movement of said parts, and a generally vertically movable connection connected at its lower end with one of said downwardly movable parts and adapted to be connected at its upper end with said tractor power lift controlling means, whereby said controlling means is operated to raise the implement upon the occurrence of an overload sufficient to buckle said upper link parts.

References Cited in the file of this patent
UNITED STATES PATENTS

| | | |
|---|---|---|
| 626,822 | Baseman | June 13, 1899 |
| 903,867 | Kalkhurst | Nov. 17, 1908 |
| 999,877 | Rowell | Aug. 8, 1911 |
| 1,683,017 | Bechtelheimer et al. | Sept. 4, 1928 |
| 1,916,945 | Ferguson | July 4, 1933 |
| 2,309,750 | Carrington | Feb. 2, 1943 |
| 2,350,880 | Dellinger et al. | June 6, 1944 |
| 2,405,980 | Sands et al. | Aug. 20, 1946 |
| 2,433,019 | Arps | Dec. 23, 1947 |
| 2,455,727 | Bunting | Dec. 7, 1948 |
| 2,459,098 | Simmons | Jan. 11, 1949 |
| 2,597,692 | Wills et al. | May 20, 1952 |
| 2,659,286 | Metzger | Nov. 17, 1953 |
| 2,672,082 | Frevik | Mar. 16, 1954 |
| 2,688,283 | Love | Sept. 7, 1954 |